Jan. 26, 1965  J. H. HEESSELS  3,167,326
HOLDER
Filed June 19, 1961

INVENTOR
JOHANNES H HEESSELS
BY
AGENT

United States Patent Office 3,167,326
Patented Jan. 26, 1965

3,167,326
HOLDER
Johannes Hendrikus Heessels, Emmasingel, Eindhoven, Netherlands, assignor to North American Philips Company, Inc., New York, N.Y., a corporation of Delaware
Filed June 19, 1961, Ser. No. 118,042
Claims priority, application Netherlands, July 12, 1960, 253,716
3 Claims. (Cl. 279—3)

This invention relates to holders for holding objects by means of differential pressure, comprising a space which can be closed by the object to be held and which has one or more apertures, connected to a suction line.

Such holders are known and used, for example, in electric light bulb manufacture in which the holder is utilized for holding and transporting envelopes.

It is common practice to connect such holders to a subpressure system, more particularly use being made of only one subpressure system and a plurality of holders being used at the same time. This occurs in the case of a plurality of holders arranged on one and the same machine.

If one of the holders is not provided with an object, the ambient air enters the suction line unhindered through the open holder and as a result the subpressure for the objects to be held in other holders becoming unduly low.

An object of the invention therefore is to provide a holder which automatically prevents ambient air entry into the subpressure system in the absence of an object in a reliable and simple manner.

A holder according to the invention, is characterized in that it comprises a valve body provided with a central bore, which valve body has a thin stem portion and an enlarged head portion, the stem portion being situated near the object to be held and the head portion being slidable in a space within the holder in a substantially gas-tight manner; the valve body being moved by differential pressure forces to a position co-acting with a valve seat so that the connection between the space adapted to be closed by the object and the suction line is shut off. In this holder the stem portion extends into the space adapted to be closed by the object to be held and the head portion extends into a separate, substantially cylindrical space; the portion of the valve body situated between the stem and head portions being surrounded by the suction line. Owing to the central bore provided in the valve body, the ambient air can enter freely into the case of a holder without an object and the valve body is displaced to the shut off position due to pressure differences acting upon it. By suitable choice of the length of the stem portion of the valve it may be ensured that the valve is moved from its seat by bringing the object against the holder.

In a preferred embodiment, the holder has only one suction aperture opposite the object to be held and the stem portion of the valve body can reciprocates in the suction aperture with a certain amount of play. This affords the advantage that the structure of the valve body is made simple, and the wall defining the single suction aperture forms the valve seat.

In another embodiment, in order to prevent the air contained in the holder space receiving the valve body from being compressed upon displacement of the valve body, the side wall of at least that portion of the valve body which is in the space adapted to be closed by the object has one or more apertures.

In order that the invention may be readily carried into effect, several embodiments will now be described in detail, by way of example of preferred embodiments, with reference to the accompanying diagrammatic drawing, in which.

Figure 1:
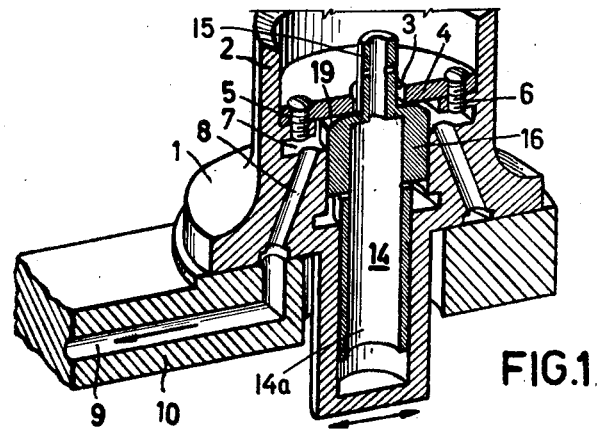
FIGURES 1 and 2 show a first embodiment, FIGURE 1 being a sectional view of the holder in which a valve body is slidable and FIGURE 2 showing the holder with an object to be held in place.

A holder 1 as seen in FIGURE 1 has a recess formed by a cylinder portion 2 and a plate or wall 4 provided with a suction aperture 3. The plate 4 is secured in the holder by means of screws 5 and 6. The holder 1 also has an interior space 7 which communicates through a duct 8 with a duct 9, provided in a supporting member 10 and adapted to be connected to a subpressure system. The holder comprises, in addition, a hollow valve body or member 14 having a thin stem portion 15, surrounded by the suction aperture 3, and a thicker head portion 16. The head portion 16 is slidable in the holder 1 in a substantially gas-tight manner. The holder 1 is slidably arranged relative to the supporting member 10 and can adhere as it were to the supporting member 10 by connecting the ducts 8 and 9 to a pressure below atmospheric pressure. This permits of slightly displacing the holder over the supporting member 10, for example for the purpose of adjustment.

Figure 2:
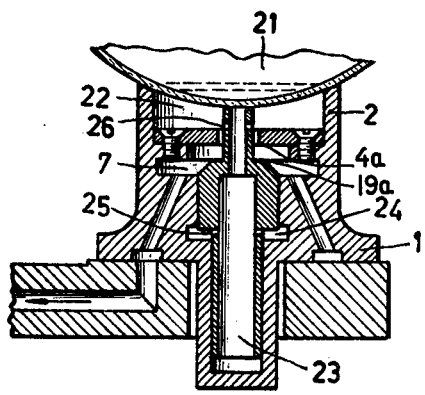

When a pressure below atmospheric pressure is brought about through the duct 9, this subpressure will reach the space 7 through the duct 8. The atmospheric pressure of the ambient air prevails in the interior or central aperture 14a of the hollow valve member 14. Since a conical enlarged head portion 19 of the valve member is situated in the space 7 which is under pressure below atmospheric pressure, the valve member 14 occupies the position shown, in which it shuts off the suction aperture 3 by engagement between valve seat 4a and the valve head or shoulder 19a (FIG. 2). By subsequently bringing an object 21 to be held against the upper edge of the holder 1 in the manner shown in FIGURE 2, the valve member 14 assumes a lower position (FIG. 2), resulting in the space 22 communicating with the space 7. The object 21 is thus held in the holder due to a differential pressure. A pressure below atmospheric pressure also prevails in the spaces indicated by 23 and 24 due to apertures 25 and 26 provided in the side wall of the valve member. The valve member 14 will thus be held in this position as long as the object is in place.

Figure 3:
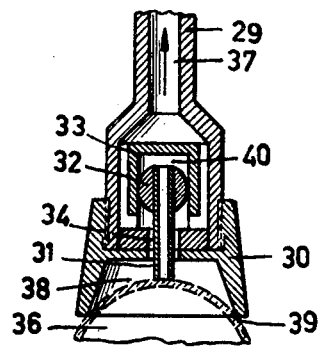
FIGURE 3 shows another embodiment of a holder according to the invention in which the valve body has a somewhat different shape.

In the embodiment shown in FIGURE 3, use is made of a valve body of a different structure. A holder 29, 30 comprises a valve body formed by a sphere 32 secured about a hollow pin 31 and slidable in a cylindrical sleeve 33 rigidly connected to the holder. In this embodiment also, the pin 31 extends through a suction aperture 34 with a certain amount of play. The operation of the valve shown here is similar to that previously described. When an object 36, shown in broken lines, is pushed against an edge 39 of the holder, the pin 31 is also displaced in the sleeve 33, so that the ball 32 is disengaged from the suction aperture 34, thus establishing communication between a space 37, connected to a suction line, and a space 38 situated between the object and the holder. After the object is placed on the holder it will be held there by differential pressure as before. When the object 36 is withdrawn from the holder, the ball 32 is drawn as seen in FIG. 3, inter alia by the action of the atmospheric pressure of the ambient air then prevailing in a cylindrical space 40 and by a lower pressure on the other side of the ball 32. The ball 32 then shuts off the suction aperture 34.

What is claimed is:

1. Apparatus for holding an object by the use of differential pressure comprising a holder body member having means for engaging an object to be held thereby and defining a recess in said body member, an aperture in a wall of said body member communicating said recess with a source of subatmospheric pressure, a valve member reciprocal within a bore of said body member for opening and closing said aperture, said valve member having a stem portion freely movable within said aperture and in spaced relation with said wall, said stem portion projecting into said recess for engagement with an object positioned on said means, and an enlarged head portion slidable in said bore connected with said stem on the side of said wall remote from said recess, a valve seat on said wall adjacent said head portion, a central aperture through said valve member for admitting ambient atmospheric pressure to the interior of said bore for forcing said head portion against said valve seat when said central aperture is opened to the atmosphere.

2. Apparatus according to claim 1 wherein said head portion is spherical.

3. Apparatus according to claim 1 with the addition of a bleed hole in said stem portion communicating said recess and said central aperture for reducing atmospheric pressure in said bore when an object closes the central aperture at said stem portion.

References Cited in the file of this patent
UNITED STATES PATENTS

| | | |
|---|---|---|
| 1,618,378 | Hatcher | Feb. 22, 1927 |
| 2,198,765 | Featherstone et al. | April 30, 1940 |
| 2,680,994 | Wood | June 15, 1954 |
| 3,020,684 | Oldfield et al. | Feb. 13, 1962 |